Jan. 7, 1941.  J. FRASER  2,227,578
HOSE COCK FOR USE WITH APPARATUS FOR DISPENSING
MEASURED QUANTITIES OF LIQUID
Filed April 7, 1939
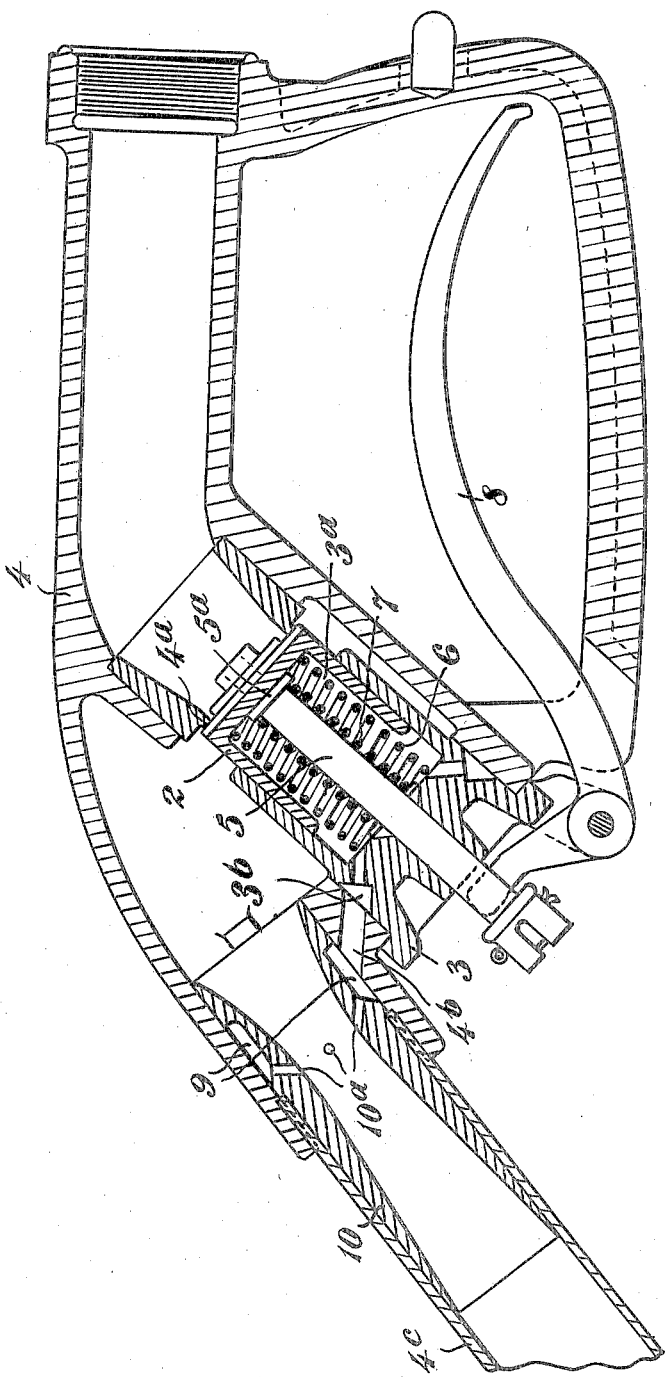
Inventor:- John Fraser.
Per:- George E. Folk
Attorney.

Patented Jan. 7, 1941

2,227,578

UNITED STATES PATENT OFFICE 2,227,578

HOSE COCK FOR USE WITH APPARATUS FOR DISPENSING MEASURED QUANTITIES OF LIQUID

John Fraser, London, England, assignor to Avery-Hardoll Limited, London, England Application April 7, 1939, Serial No. 266,491
In Great Britain April 25, 1938

3 Claims. (Cl. 137—139)

This invention has reference to improvements relating to hose cocks for use with apparatus for dispensing measured quantities of liquid, and is concerned particularly with hose cocks for apparatus for this purpose of the flow meter type.

With hose cocks for use with liquid dispensing apparatus as aforesaid it is the general practice to incorporate a valve means which normally tends to prevent a flow of liquid but which subsequent to its subjection to a control operation by the operator automatically permits delivery to take place when a sufficient delivery pressure has been created.

Hose cocks equipped in this manner are open to the objection however that if large quantities of liquid are required to be dispensed quickly the resistance to the flow of the liquid imposed by the valve means due to the tendency of the valve means to interrupt delivery materially either reduces the rate of delivery or increases the pumping effort and the present invention has for its object the provision of an improved hose cock for the purpose referred to which embodies the advantages of hose cocks incorporating a valve means as hereinbefore described but which is not subject to the objections referred to.

A convenient embodiment of the invention will now be described with particular reference to the accompanying drawing which illustrates the invention in its application to a hose cock for use with apparatus of the flow meter type for dispensing measured quantities of liquid said hose cock being of a known kind wherein the hose cock incorporates a single valve which is normally maintained on its seat by a relatively strong spring means which is subject to the direct control of the operator but which co-operates with a second and relatively weaker spring means which is sufficiently strong to move the valve on to its seat when pumping ceases or when pressure in the discharge line falls below a predetermined minimum.

According to the embodiment of the invention illustrated the piston valve 2 is slidably mounted in a cylindrical chamber 3ª which is located within the body 4 of the hose cock and which is formed integral with a plug 3 which constitutes a closure means for an aperture in the body of the hose cock below the position occupied by said piston valve 2. The closed acting end of the piston 2 is abutted at its centre by the upper end of a rod 5 which in turn is slidably mounted within the plug 3. The underside of the central portion of the closed end of the piston valve 2 normally rests on a flange 5ª on the rod 5. Interposed between the underside of the head of the piston valve 2 and the plug 3 is a relatively weak coil spring 6 whereas interposed between the flange 5ª and the plug 3 is a relatively strong coil spring 7, said springs 6 and 7 in conjunction with the rod 5, tending to force the acting face of the valve piston 2 on to its seat 4ª in the body 4 of the hose cock. The lower end of the rod 5 co-operates with the shorter arm of a lever 8 pivoted to the body 4 of the hose cock said lever 8 providing means for relieving the piston valve 2 of the pressure of the stronger spring 7 when it is desired to open the hose cock. The weaker spring 6 tends to maintain the piston valve 2 on its seat 4ª even when the piston valve 2 has been relieved of the pressure of the stronger spring 7 by manipulation of the lever 8 but it will be understood that the spring 6 is insufficient to maintain the piston valve 2 closed when pumping commences and the pressure in the delivery line exceeds a predetermined minimum.

The interior of the cylindrical chamber 3ª is connected by passages 3ᵇ and 4ᵇ with an annular space 9 which is in communication with the bore of a Venturi tube 10 fixed in the delivery nozzle 4ᶜ, by way of passages 10ª drilled in the walls of the said Venturi tube. The passages 10ª in the walls of the Venturi tube 10 enter the bore of the said tube 10 at the constriction.

It will be appreciated that when delivery is taking place the passage of the liquid through the bore of the Venturi tube 10 creates a Venturi effect which will induce a suction in the cylindrical chamber 3ª containing the piston valve 2 and thereby introduce a force which counteracts the tendency of the weaker spring 6 to move the valve 2 to the closing position. Thus it will be understood that the counterbalancing of the force tending to close the valve 2 when delivery is taking place minimises or totally eliminates any development of back pressure by the valve 2 thus enabling delivery to take place at increased speed.

What I claim is:

1. A hose cock for use with liquid measuring and dispensing apparatus having a valve the acting face of which is opposed to the line of flow of the liquid to be measured and dispensed, a weak spring means and a relatively stronger spring means which tend to maintain the said valve closed, means under the control of an operator for relieving said valve of the influence of the stronger spring means in order to permit the valve to open under the influence of liquid pressure when this attains or exceeds an amount which is sufficient to overcome the tendency of the weaker spring means to close the valve and means for causing a delivery flow when in being to engender a Venturi effect and for utilising this Venturi effect to counteract the tendency of the weaker spring means to move this valve to the closed position and so to interrupt delivery whereby subsequent to the relief of the valve from the influence of the stronger spring means by the control operation and the attainment of a predetermined rate of flow the valve is automatically prevented from resisting a delivery so long as the aforesaid control is exercised and the predetermined rate of delivery maintained or exceeded.

2. A hose cock for use with liquid measuring and dispensing apparatus incorporating a chamber, a piston valve which is displaceably mounted within said chamber and the acting face of which is opposed to the line of flow of the liquid to be measured and dispensed, a seating for the acting face of said valve which is located intermediate the inlet and discharge sections of the hose cock, a weak spring means acting on said piston valve and which normally tends to maintain the acting face of the valve closed on its seating but the resistance of which is overcome to permit the valve to open when a predetermined pressure is generated in the delivery line, a relatively stronger spring means which also tends to maintain the acting face of the valve on its seating, a control means for relieving the valve of the closing influence of the stronger spring means, a Venturi tube located within the delivery passage on the discharge side of the aforesaid valve, communicating passages between the bore of the Venturi tube and the aforesaid valve chamber whereby upon relieving the valve from the influence of the controlled stronger spring means due to the manipulation of the control means by an operator and the subsequent opening of the valve against the influence of the weaker spring means by the generation of the requisite pressure in the delivery line, the Venturi effect created in the Venturi tube by the delivery flow is caused to re-act on the valve and to cause the said valve to resist the closing influence of the weak spring means.

3. A hose cock for use in liquid measuring and dispensing apparatus comprising a body having an inlet section and a discharge section, a delivery nozzle constituting an extension of the discharge section, a cylindrical chamber located within the body intermediate the inlet and discharge sections, said cylindrical chamber being closed at its lower end and open at its upper end, a piston valve the acting face of which is opposed to the line of flow of the liquid to be measured and dispensed and the skirt of which is slidably mounted within said chamber, a seating located intermediate the inlet and discharge sections for co-operation with the said acting face of the valve, a means movably mounted within the closed end of the cylindrical chamber having a flange constituting an abutment for the underside of the closed end of the piston valve, a weak spring means which is interposed between the closed end of the chamber and the underside of the closed end of the piston valve and which tends to maintain the acting face of the piston valve on its seating but the resistance of which is overcome to permit the valve to open when a predetermined pressure is generated in the delivery line, relatively stronger spring means interposed between the aforesaid flange and the closed end of the cylindrical chamber which tends also, through the abutment of the flange and the under side of the closed end of the piston valve, to maintain the acting face of the piston valve on its seating, a manually operable means for effecting a displacemnt of the said movable means for moving the flange out of abutment with the piston valve when it is desired to effect a delivery in order to relieve the piston valve of the closing influence exerted by the stronger spring means, a Venturi tube located in the discharge section, an annular space surrounding the Venturi tube, passages which communicate with the said annular space and which enter the bore of the Venturi tube at the constriction and passages for placing the said annular space in communication with the lower end of the cylindrical chamber whereby upon relieving the piston of the influence of the stronger spring means due to the manipulation of the control means by the operator and the subsequent opening of the valve against the influence of the weaker spring means by the generation of the requisite pressure in the delivery line, the Venturi effect created in the Venturi tube by the delivery flow induces a suction effect in the cylindrical chamber which tends to maintain the piston valve open and to resist the closing influence of the weaker spring means.

JOHN FRASER.